United States Patent Office 2,858,227
Patented Oct. 28, 1958

2,858,227
BUILDING MATERIAL

Bernard Rodsky, El Paso, Tex., assignor of thirty-seven and one-half percent to James C. Boyd and thirty-seven and one-half percent to William E. Boyd No Drawing. Application September 14, 1955
Serial No. 534,391

9 Claims. (Cl. 106—97)

This invention relates to building material, and more particularly to a light weight building material which may be formed in or to various shapes and to a method of making the same.

From the time that prehistoric man first erected a housing unit, the materials used for building and similar purposes have involved an almost inconceivable variety, of both natural and artificial origin, from the brush and mud or leather covered huts of the aborigine to the ponderous stone edifices of the Greeks and Romans, the wood and brick buildings of mediaeval to more modern times, and the towering sky scrapers of steel, glass and various other materials. The cost of building material has usually been a large factor, in the use thereof, although very infrequently of no particular moment, as when thousands of slaves were available to move huge masses of stone, as in building the pyramids. Allied with cost has been the weight factor, since the transportation of heavier building materials has normally restricted use thereof to a relatively small distance from the locale of manufacture. Of course, in the case of some materials, such as steel and the more expensive decorative materials, transportation has not added prohibitively to the final cost. However, clay bricks usually must be used within a short distance of a brick factory to be economical. Wood, of course, has been used widely as a building material from prehistoric times and some varieties of wood are often shipped long distances. There are also various compositions of gypsum and the like which are particularly useful in building interiors, where weather resistance is not a prominent factor. Portland cement is also used for a great many buildings, normally being mixed with sand and gravel aggregate, as for foundations, floors, walls and the like, as in reinforced concrete structures. Due to the weight of concrete, it must be poured on the job and also is not readily formed to shape, since the final shape must be provided by the forms in which it is poured. Also, gypsum and similar lighter weight materials suffer from the disadvantage that they are generally extremely friable, are usable only in the form of flat sheets and do not tend to retain nails, screws or the like, which must be driven therethrough into something else, such as a wood stud or joist.

Acoustical material, such as formed primarily from asbestos or the like, is used widely not only for sound, but also for heat, insulating purposes, but has similar disadvantages to that of gypsum board. Thus, even with the plethora of building materials available, there is still a need for a building material which is light in weight yet comparatively high in strength and which can be readily formed to shape, and on which other operations can be performed.

Among the objects of this invention are to provide a novel building material; to provide such a material which may be formed in blocks, sheets or any other desired shape; to provide such a material which can be sawed, cut, turned, drilled or otherwise suitably formed to any other desired shape; to provide such a material which is resistant to weathering, particularly moisture; to provide such a material which is sufficiently light in weight that it can be shipped economically for some distance; to provide such a material which has desirable insulating properties, as well as structural strength; and to provide such a material which may be produced economically.

The above and additional objects of this invention, together with the novel features thereof, will become apparent from the description which follows.

In accordance with the present invention, a building material which is light in weight, yet has a comparatively high structural strength, may be provided by utilizing a mixture of expanded perlite and Portland cement, preferably in the proportions hereinafter specified, to which is added a small amount of an additive solution of certain chemicals and additional water added, as necessary, to form a viscous slurry. This slurry is subjected to pressure, as by extrusion or in a press to form sheets, slabs, blocks, tubes or any other desired shape, either regular or irregular, which may be cured in the open air or by heat or steam. For curing, pressure does not appear to be necessary, so that the cost of curing may be made relatively low, although the use of heat or steam appears to decrease the time necessary for curing. Nevertheless, adequate results have been secured by leaving the blocks in the open air for a period of 21 days. Depending upon the amount of additive solution used and also upon the pressure, the structural strength may vary from values on the order of 400 lbs. per square inch to over 1,000 lbs. per square inch in compression. In addition, nails have been driven into the material and held, while the material has been sawed and otherwise cut without any tendency for corners or portions along the line of severance to break off.

Although other proportions may be utilized, the preferred proportions of expanded perlite and Portland cement are as follows:

| | Amount, lbs. | Percent by Weight |
|---|---|---|
| Portland cement | 1,800 | 54.6 |
| Perlite, expanded | 1,500 | 45.4 |

Perlite is a naturally occurring form of obsidian or vitreous rock, i. e., a volcanic cinder product, usually appearing as a mass of enamel-like globules which will expand, upon the application of heat, as from 800° F. to 2000° F., to form light granules, which may weigh from 3 to 40 lbs. per cubic ft., as compared with a weight of 70 to 90 lbs. per cubic ft. in the natural state. An analysis of an example of perlite, by weight, is as follows:

| | Percent |
|---|---|
| $SiO_2$ | 74.5 |
| $Al_2O_3$ | 14.0 |
| $K_2O$ | 4.3 |
| $Na_2O$ | 3.0 |
| $Fe_2O_3$ | 1.8 |
| CaO | 1.4 |
| MgO | 1.0 |
| | 100 |

The expanded perlite is preferably relatively finely divided, such as —200 mesh, although other particle sizes may be utilized. The expanded perlite may be ground or otherwise treated to produce particles of the desired size, although expansion of perlite from certain deposits by heat may produce a good proportion of fines or particles or granules of 200 mesh or less, since the granules tend to crumble on heating. Particles of 200 mesh and less may weigh on the order of 20 to 30 lbs. per cubic ft.

The additive solution may be made by dissolving minor amounts of aluminum sulphate, copper sulphate and hydrated lime, and a larger amount of calcium chloride, in water, the hydrated lime preferably being added last, preferably being well mixed into the solution after the other constituents have been dissolved therein. The preferred amounts and proportions of the above ingredients for the additive solution are as follows:

|  | Amount | Percent by weight |
|---|---|---|
| Water | 45 gal. | 78.8 |
| Aluminum sulphate | 6 lbs. | 1.2 |
| Copper sulphate | 3 lbs. | .6 |
| Calcium chloride | 89 lbs. | 18.8 |
| Hydrated lime | 3 lbs. | .6 |
|  |  | 100 |

After all of the constituents have been dissolved and are well mixed therein, the hydrated lime being added last, as indicated above, the above amounts will produce about 50 gallons of additive solution. From 2½ to 5 gallons of this additive solution is utilized for a mixture of 1800 lbs. of Portland cement and 1500 lbs. of expanded perlite, with proportional changes in the amount of additive solution for smaller and larger batches. Thus, for a smaller batch, containing 150 lbs. of expanded perlite and 180 lbs. of Portland cement, from 1 to 2 quarts of the additive solution may be utilized. The amount of water added to form the slurry may, of course, be varied, although a relatively dry, thick slurry is preferable. The pressure produced during extrusion or in the press may also vary, although between 600 and 800 lbs. per square inch may be preferred.

When made in the form of brick or tile, the same may be placed in a furnace and heated to a suitable temperature, such as 1500° F., to produce a glaze on one or more surfaces to which a suitable glazing material, such as rock salt, has been applied. In addition, a suitable coloring material may be added to the slurry, so that the final product will have a desired color.

If desired, the building material may be made directly at the mine which produces the perlite, merely by providing heating furnaces in which the perlite is expanded, i. e., a "popping" plant, with suitable mixers in which the additive solution may be prepared and additional mixers in which the slurry may be prepared, together with an extrusion press, which may feed the extruded shape directly into a furnace for quick curing, followed, if desired, by conveyor loading directly into trucks or railway cars. The temperature to which the extruded shape is to be heated for curing need not be unduly high, such as about 100° F.

The material of this invention has numerous possible uses. Thus, the material may be formed into slabs or sheets for use in the same manner as wall board in providing a covering material for walls and ceilings. Also, it may be formed into blocks for use as insulation, bricks and the like. The slabs or sheets may be cut to any desired shape or formed, as by sawing or the like, without the same danger of parts breaking off as in the case of wallboard made primarily of gypsum. Nails and screws may be placed in the material itself without having to pass entirely through and into a supporting member, while parts formed of the material may be riveted or otherwise attached to other such parts. The material may be extruded into tubular or other hollow shapes for suitable use thereof, and may be formed as columns, as for use as mine props or supports, particularly in instances where mineralized water may tend to cause wood props or supports to rot out or deteriorate. Columns or slabs of the material may also be cut, as by turning on a lathe, in a manner similar to wood, to form decorative pieces. Due to the material been unaffected by water and moisture, slabs of the material may be utilized in making housings and other parts for water towers or the like, as for cooling purposes. Slabs or other shapes of the material may also be used for underground storage receptacles, such as caskets. The material may also be pressed or extruded into suitable structural shapes for use in prefabricated housing units or in making outdoor furniture and the like, particularly objects which are to be subjected to outside weather conditions. Slabs and blocks of the material also appear to have considerable resilience, so that the same may be substituted for cork flooring and other similar materials. When glazed, as in the manner previously described, the material may be used for decorative purposes, as in a manner similar to decorative tile or as a substitute for other types of tile, such as roofing tile. A block or ring of the material may also be provided with a flash copper plating, on which a silver or chromium layer may be plated, for electrical uses. When strength is less a factor, as when used for heat insulation purposes, blocks of the material may be laid in position with the slurry previously described or a heat insulating layer may be made by troweling or otherwise suitably placing the slurry in position. The material may be colored, as by adding an aniline dye, vegetable dye or other water soluble dye to the slurry.

It will be understood, of course, that the proportions of the constituents used may be varied from those preferred, such as within approximately the following ranges, for the additive solution:

| | Percent |
|---|---|
| Aluminum sulphate | 0.5 to 2.4 |
| Copper sulphate | 0.2 to 1.2 |
| Calcium chloride | 10 to 36 |
| Hydrated lime | 0.2 to 1.2 |
| Water | Balance |

The above constituents are preferably the commercial grades, but more pure or less pure ingredients may be utilized. Also, the proportions of Portland cement to expanded perlite may be varied from those preferred, although the Portland cement will preferably be at least slightly in excess, by weight, of the amount of expanded perlite. While no satisfactory substitute for expanded perlite, Portland cement or hydrated lime has been found, it will be understood that satisfactory substitutes for the remaining ingredients may be found. For instance, as a substitute for copper sulphate, it may be possible to produce satisfactory results by the use of other sulphates, such as lead, nickel, zinc, barium, magnesium, calcium, iron, sodium or potassium sulphates. Similarly, as a substitute for aluminum sulphate, it may be possible to produce satisfactory results by using instead aluminum carbonate, aluminum hydroxide or magnesium sulphate. Also, as a substitute for calcium chloride, it may be possible to produce satisfactory results by using instead another chloride, such as magnesium chloride or sodium or potassium chloride. Thus, it will be understood that numerous variations may be made and that other embodiments may exist, all without departing from the spirit and scope of this invention.

What is claimed is:

1. In a method of making a building material, the steps of forming an additive solution by dissolving in water from 0.5% to 2.4% of a member of the group consisting of aluminum sulphate, aluminum carbonate, aluminum hydroxide and magnesium sulphate, from 0.2% to 1.2% of a member of the group consisting of copper sulphate, lead sulphate, zinc sulphate, barium sulphate, magnesium sulphate, calcium sulphate, iron sulphate, sodium sulphate and potassium sulphate, from 10% to 36% of a member of the group consisting of calcium chloride, magnesium chloride, sodium chloride and potassium chloride, and from 0.2% to 1.2% of hydrated lime, said percentages being by weight and the balance being essentially water; adding a relatively small proportion of such additive solution to expanded perlite and Portland cement, said Portland cement being at least equal in weight to the weight of said perlite, and mixing the same; then adding water in sufficient amount to form a slurry.

2. In a method of making a building material, as defined in claim 1, wherein water is added in an amount to form a viscous slurry and which includes the additional step of subjecting said slurry to pressure.

3. In a method of making a building material, as defined in claim 2, which includes the additional step of subjecting the product of such pressure treatment to heat for curing.

4. In a method of making a building material, the steps of forming an additive solution by dissolving in water from 0.5% to 2.4% of aluminum sulfate, from 0.2% to 1.2% of copper sulfate, from 10% to 36% of calcium chloride, and from 0.2% to 1.2% of hydrated lime, said percentages being by weight and the balance being essentially water; adding such additive solution to expanded perlite and Portland cement, said Portland cement being at least equal in weight to the weight of said perlite and said additive solution being in the proportion of from 2½ to 5 gallons for approximately 3,300 pounds of perlite and cement, and mixing the same; then adding water in a sufficient amount to form a slurry.

5. In a method of making a building material, as defined in claim 4, wherein said additive solution comprises amounts by weight in proportion to 1.2% aluminum sulphate, 0.6% copper sulphate, 18.8% calcium chloride, 0.6% hydrated lime and the balance water, to make a total of 100%.

6. In a method of making a building material, as defined in claim 4, wherein said additive solution comprises amounts in proportion to approximately 45 gallons of water, approximately 6 lbs. of aluminum sulphate, approximately 3 lbs. of copper sulphate, approximately 69 lbs. of calcium chloride and approximately 3 lbs. of hydrated lime; wherein said expanded perlite and Portland cement comprise amounts in proportion to 1800 lbs. of Portland cement and 1500 lbs. of expanded perlite having a particle size of approximately 200 mesh or less; and wherein said additive solution is added in an amount in proportion to 2½ to 5 gallons for 1800 lbs. of Portland cement and 1500 lbs. of expanded perlite.

7. In a method of making a building material, as defined in claim 6, wherein sufficient water is added to said Portland cement and expanded perlite to form a viscous slurry; and wherein said slurry is subjected to a pressure of approximately 600 to 800 lbs. per square inch.

8. An article of manufacture, in the pressed and cured state, consisting essentially of the hydrated reaction product of a mixture of Portland cement and expanded perlite with an aqueous solution having the proportions of approximately 45 gallons of water, 6 pounds of aluminum sulfate, 3 pounds of copper sulfate, 89 pounds of calcium chloride and 3 pounds of hydrated lime, the amount of the said aqueous solution being in the proportion of between 2½ and 5 gallons for approximately 1800 pounds of Portland cement and 1500 pounds of expanded perlite.

9. An article of manufacture, in the pressed and cured state, consisting essentially of the hydrated reaction product of a mixture of Portland cement and expanded perlite with a relatively small proportion of an additive solution having the proportions of from 0.5% to 2.4% of a member of the group consisting of aluminum sulphate, aluminum carbonate, aluminum hydroxide and magnesium sulphate, from 0.2% to 1.2% of a member of the group consisting of copper sulfate, lead sulphate, zinc sulphate, barium sulphate, magnesium sulphate, calcium sulphate, iron sulphate, sodium sulphate and potassium sulphate, from 10% to 36% of a member of the group consisting of calcium chloride, magnesium chloride, sodium chloride and potassium chloride, and from 0.2% to 1.2% of hydrated lime, said percentages being by weight and the balance being essentially water, said Portland cement being at least equal in weight to the weight of said perlite.

References Cited in the file of this patent

UNITED STATES PATENTS

| | | |
|---|---|---|
| 931,884 | McCormick | Aug. 24, 1909 |
| 1,296,468 | Blumenberg | Mar. 4, 1919 |
| 1,781,267 | Buhman | Nov. 11, 1930 |
| 2,553,618 | Willson | May 22, 1951 |
| 2,585,366 | Bollaert | Feb. 12, 1952 |
| 2,598,981 | Denning | June 3, 1952 |